(No Model.) 3 Sheets—Sheet 1.

J. W. PIVER.
PLOW.

No. 356,548. Patented Jan. 25, 1887.

Witnesses
F. L. Ourand
F. E. Gaither

Inventor
John W. Piver
By his Attorney
Frank A. Fouts.

(No Model.) 3 Sheets—Sheet 2.

J. W. PIVER.
PLOW.

No. 356,548. Patented Jan. 25, 1887.

(No Model.) 3 Sheets—Sheet 3.

J. W. PIVER.
PLOW.

No. 356,548. Patented Jan. 25, 1887.

WITNESSES
F. L. Durand
F. E. Gaither

INVENTOR
John W. Piver
By his atty
Frank A. Fouts

UNITED STATES PATENT OFFICE.

JOHN W. PIVER, OF AMERICUS, GEORGIA.

PLOW.

SPECIFICATION forming part of Letters Patent No. 356,548, dated January 25, 1887.

Application filed November 11, 1886. Serial No. 218,554. (No model.)

*To all whom it may concern:*

Be it known that I, JOHN W. PIVER, a citizen of the United States, residing at Americus, in the county of Sumter and State of Georgia, have invented certain new and useful Improvements in Plows; and I do hereby declare the following to be a full, clear, and exact description of the invention, such as will enable others skilled in the art to which it appertains to make and use the same.

My invention relates to plows; and it consists, principally, in laterally adjustable and reversible frame-pieces whereby the distance between the cuts of the plows may be regulated; and it also consists in other parts and combinations, which will be hereinafter specified, and pointed out in the claims.

Figure 1:
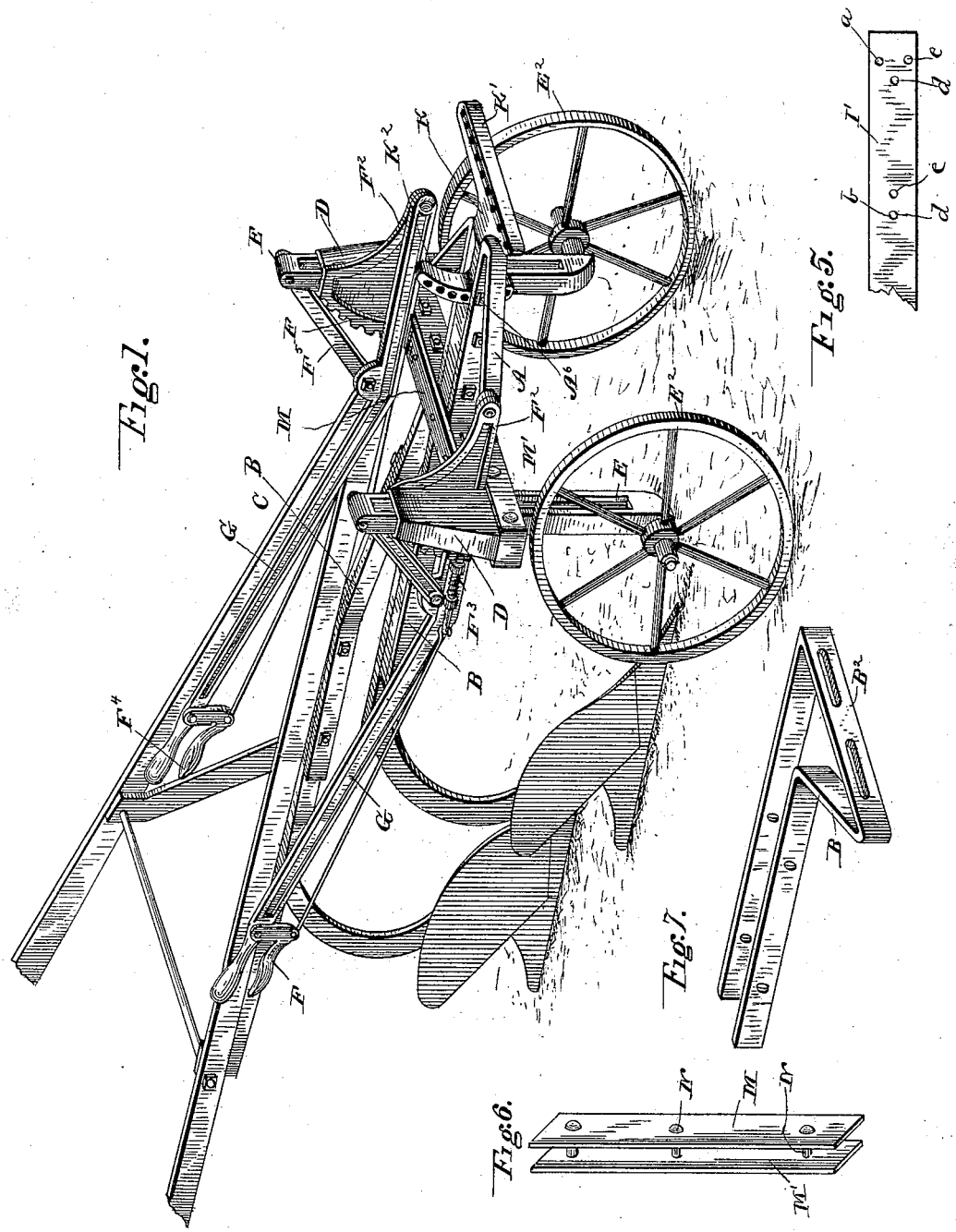
Figure 2:
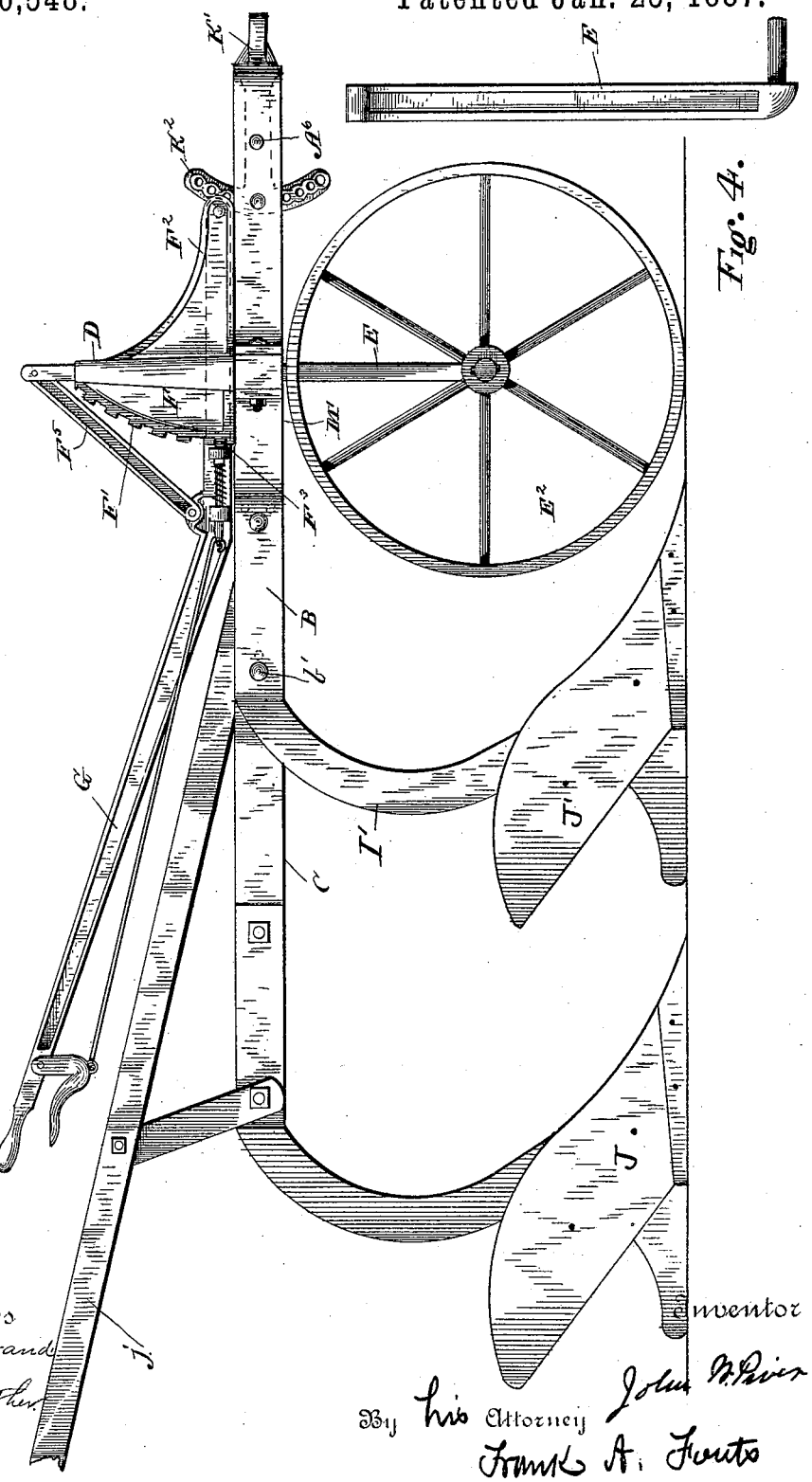
Figure 3:
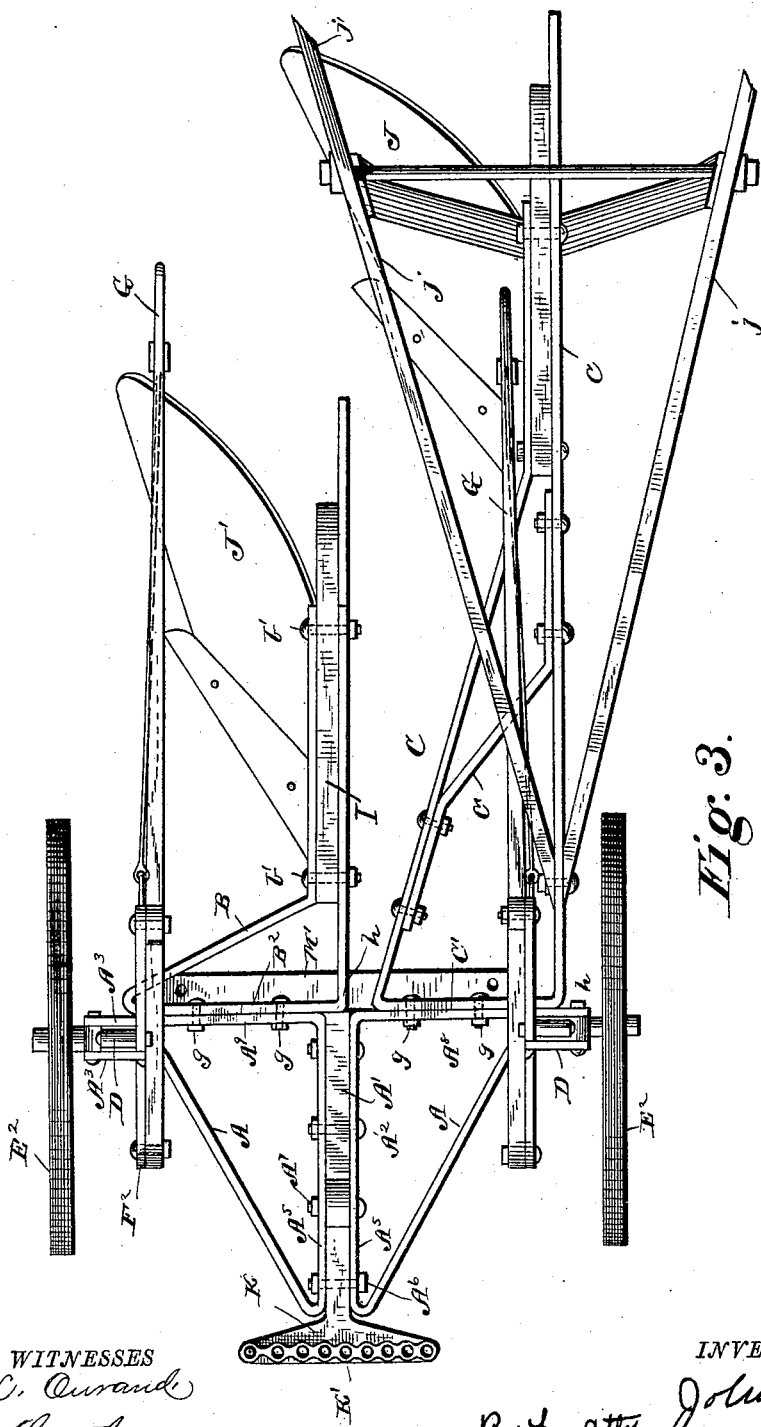

In the accompanying drawings, Figure 1 represents a perspective view of my invention. Fig. 2 is a side elevation. Fig. 3 is a top plan view; Fig. 4, a detail of the vertical arm and its spindle for the reception of one of the wheels. Fig. 5 is a fragment of the plow-standard, showing the horizontal continuation of said standard provided with a series of openings for bolts. Fig. 6 is a perspective view of two clamping-plates and their bolts, and Fig. 7 is a perspective view of one of the adjustable and reversible rear frame-pieces.

Like letters indicate like parts in the several views.

The frame is constructed of four independent pieces. The two forward pieces are represented by the letters A A, and the two rear pieces by B and C. The two forward pieces are triangular in form. Between the two inner or base pieces of the frame-pieces A is interposed a block, A', preferably of metal. A series of bolts, A², unite this block and said frame-pieces A. Each of the frame-pieces A is formed of a single metallic bar bent upon itself, the outer ends whereof (marked A³) extend outward and lie in a parallel line. A housing, D, is secured by bolts between the outer ends, A³. This housing is provided with a vertical opening from top to bottom. The upper end of the vertically-adjustable arm E passes through this opening. The lower end of this arm is provided with a spindle extending outward at right angles. One of the wheels E² is mounted on this spindle. On the inner side of the housing is a segmental rack, F, provided with teeth F'. Said rack is provided with a forward extension, F². A lever, G, has its forward end fulcrumed to the outer end of said extension. This lever extends rearward horizontally from its fulcrum and thence slightly upward. Said lever is provided with a spring-actuated detent, F³. The rear end of this detent is connected to a rod. The upper end of the rod is jointed to a handle-piece, F⁴, which is pivoted to the upper end of the lever. A short arm, F⁵, is jointed at its lower end to the lever, and has its upper end jointed to the top of the adjustable arm E. By moving the lever up and down the arm E and its wheel are raised and lowered.

The rear frame-piece, B, is formed of a single metallic bar bent upon itself. The inner and forward pieces, as shown in Figs. 1 and 3, are bent at right angles. The two ends of this frame-piece extend rearward and lie parallel. Between these two ends is the horizontal piece I' of the plow-standard I. This standard-piece I' is shown in Fig. 5. It is provided near its forward end with three bolt-openings, $a$, and also provided with two openings for bolts, $b$, on its rear end. By means of these openings and the bolts $b'$, which pass through the rear part of the frame B and through said horizontal standard-piece, the angle of inclination of the plow-points may be varied, to wit: By inserting the bolts $b'$ through the openings $d$ the bottom of the plow is carried in a parallel line with the rear frame-pieces, B C, as shown in Fig. 2; but by changing said bolts and placing them, respectively, in the forward holes, $e\ e$, the point of the plow may be either inclined upward or downward. This adjustment of the standard and plow may be easily and quickly effected. The horizontal pieces I' are the same on both the forward and rear plow-standards. The left-hand frame-piece, C, carries the rear plow. Said frame-piece extends back centrally between the plow-handles $j$. The frame-piece C carries the left-hand plow, J, which is similar in construction to the right-hand plow, J'. A diagonal brace-bar, C', is interposed between the sides of the frame-piece C, and its ends are bolted to said frame-piece.

Between the outer forward ends of the frame-pieces A is an adjustable clevis, K. This clevis has two T-shaped heads, each at right angles to the other. The horizontal T-head K' extends forward. Said head is provided with a longitudinal series of openings. This clevis is pivoted through its shank between the two parallel bars A⁵ of the front frame-pieces, A. A⁶ is the pivotal bolt, and A⁷ the locking-bolt which passes through one of the openings in the T-head K². The T-head K² of said clevis, which lies vertically between said bars, is curved in the arc of a circle. Said curved head is provided with a series of openings. By turning this clevis on its pivotal bolt A⁶ (when the locking-bolt A⁷ is disengaged) the horizontal T-head K' is raised or lowered. The object of this feature is to effect a light or heavy draft on the plows. By lowering the T-head K² the horizontal T-head K' is elevated, thereby imparting an upward tendency to the plow-points and causing a light draft. By raising the T-head K² the outer T-head, K', is depressed, thereby imparting a downward tendency to said plow-points and effecting a heavy draft.

The rear frame-pieces B, and C, are reversible and laterally adjustable on the rear cross-pieces, A⁸ and A⁹, of the forward part of the frame. The inner ends of the rear frame-pieces (marked B² and C', respectively) abut against the cross-pieces A⁸ and A⁹, and the abutting parts are united by bolts g. The abutting ends are provided with a series of bolt-holes, so that either one or both of the rear frame-pieces may be moved laterally and secured in any desired position by means of the bolts.

By detaching a plow and its standard from one of the frame-pieces, B or C, and then detaching the frame-piece from the forward part of the frame A, said frame-piece B or C may be turned over, reversed, and the heel h thereof placed either outward or inward. For example, when it is desired to move the plow J' nearer the wheel on the right-hand side, the frame-piece B is disconnected and reversed, so that its heel h shall lie on the outer side. This would move the plow J' outward. It will also be observed that the position of the plow J may be changed and adjusted in a like manner. By means of these reversible and laterally-adjustable frames the plows can be placed in any desired position in relation to each other and in relation to the wheels. It is understood that when either of the pieces B or C is reversed its plow and standard are detached and then attached to conform to the reversed position of its frame.

A further advantage of this reversible and adjustable feature consists in the fact that both mold-boards may be placed outward and adjusted with relation to each other and the wheels. When so placed, the two heels h h of the frame B C may be placed together, thereby bringing the line of travel of the two plows close together. The advantages of these reversible features of the plows are manifest and need not be explained.

It will be observed that either wheel may be raised or lowered. This is of advantage when one wheel is in the furrow of plowed ground and the other wheel on the higher unplowed ground.

The letters M M' represent top and bottom clamp-plates. These plates are provided with openings, through which clamping-bolts N pass. The top plate, M, lies horizontally on top of the abutting ends of the frame-pieces A B C, and the bottom plate, M', lies under said abutting ends. These two plates are firmly clamped to the frame-pieces by means of bolts N. By this arrangement the parts are strengthened and rigidly held together. These plates may be detached when the rear frame-pieces are adjusted or reversed.

The inner ends of the adjustable frame-pieces B C, where they are attached to the frame A, are provided with longitudinal slots for the reception of the bolts, whereby a lateral adjustment of the rear frame-pieces may be effected without removing the bolts.

The construction of the several frame-pieces A, B, and C is of such a nature that each is a brace to itself, the diagonal pieces serving as braces to the two right-angled pieces.

Having thus described my invention, I claim as new and desire to secure by Letters Patent—

1. The reversible and adjustable rear frame-pieces, B C, each consisting of a single bar bent upon itself and having its ends extended rearward, said ends being provided with openings for the reception of bolts, in combination with a plow-standard having a horizontal piece provided with openings for the reception of bolts, and bolts for uniting said ends and standard, substantially as described.

2. The reversible and adjustable rear frame-piece, consisting of a single bar bent upon itself and having its ends extended rearward, said ends being provided with openings for the reception of bolts, in combination with a plow-standard having a horizontal piece provided with a series of openings for the reception of bolts, and bolts for uniting said ends, substantially as described.

3. The combination, with a standard having a wheel journaled on the lower end thereof, of a housing provided with an opening for the reception of said standard and a segmental toothed rack, a lever provided with a spring-actuated detent, and an arm having one end jointed to the lower and its other end jointed to the top of the standard aforesaid, substantially as described.

4. The combination of the front and rear sectional frame-pieces, the contiguous ends thereof being provided with openings for the reception of bolts, bolts for uniting said ends, top and bottom clamping-plates provided with openings for the reception of bolts, and bolts for engaging said openings, said plates being clamped to the contiguous ends of the frame-pieces, substantially as specified.

5. The combination of a sectional plow-frame consisting of four pieces, two in front and two behind, the adjacent inner sides of the two front ends being united by bolts, the rear ends of said front pieces being provided with openings for the reception of bolts, the front ends of the two rear pieces being provided with longitudinal slots and lying against the rear ends of the front pieces, and bolts for engaging said contiguous sections or pieces, the rear ends of the rear frame-pieces being provided with plows, substantially as specified.

In testimony whereof I affix my signature in presence of two witnesses.

JOHN W. PIVER.

Witnesses:
FRANK A. FOUTS,
WM. H. BATES.